May 20, 1930.  E. A. ROCKWELL  1,759,806

LIQUID LEVEL INDICATOR

Original Filed April 13, 1923

Witness
H. C. McKnight

Inventor.
Edward A. Rockwell.
by Burton & Burton
his Attorneys.

Patented May 20, 1930

1,759,806

UNITED STATES PATENT OFFICE

EDWARD A. ROCKWELL, OF LONG ISLAND CITY, NEW YORK, ASSIGNOR TO STEWART-WARNER CORPORATION, OF CHICAGO, ILLINOIS, A CORPORATION OF VIRGINIA

LIQUID-LEVEL INDICATOR

Original application filed April 13, 1923, Serial No. 631,791. Divided and this application filed December 6, 1926, Serial No. 152,896. Renewed February 14, 1929.

This application is a division of my application Serial No. 631,791 filed April 13, 1923. The purpose of the invention to be covered in this application is to provide a convenient economical and effective indicating device for showing the level of liquid, particularly fuel supply, in the main fuel tank of an automobile engine whose depth it is desirable to have at all times indicated to one occupying the driver's seat at the front of the machine. It consists in the elements and features of construction shown and described as indicated in the claims.

In the drawings:—

In the parent application above mentioned there is shown and described a construction for supplying fuel from a low level main supply tank to the carbureter of the engine by pressure derived from one cylinder of the engine through a conduit leading for discharge into a chamber formed by a tube, 35, depending in the main fuel tank, 25, from which chamber a tube, 69, leads out upwardly for connection with the pressure gauge, 70, mounted on the dashboard of the vehicle. The construction thus fully described in said parent application is such as to cause the pressure transmitted through the pipe, 69, to be only such remnant of the pressure derived from the engine for elevating the fuel to the carbureter as corresponds to and is measured by the depth of liquid remaining in the main tank; all of which is fully set forth in said parent application and will not be further described in the present application which is concerned only with the particular means of indicating to the driver that pressure and the depth of liquid in the main tank.

Figure 1:
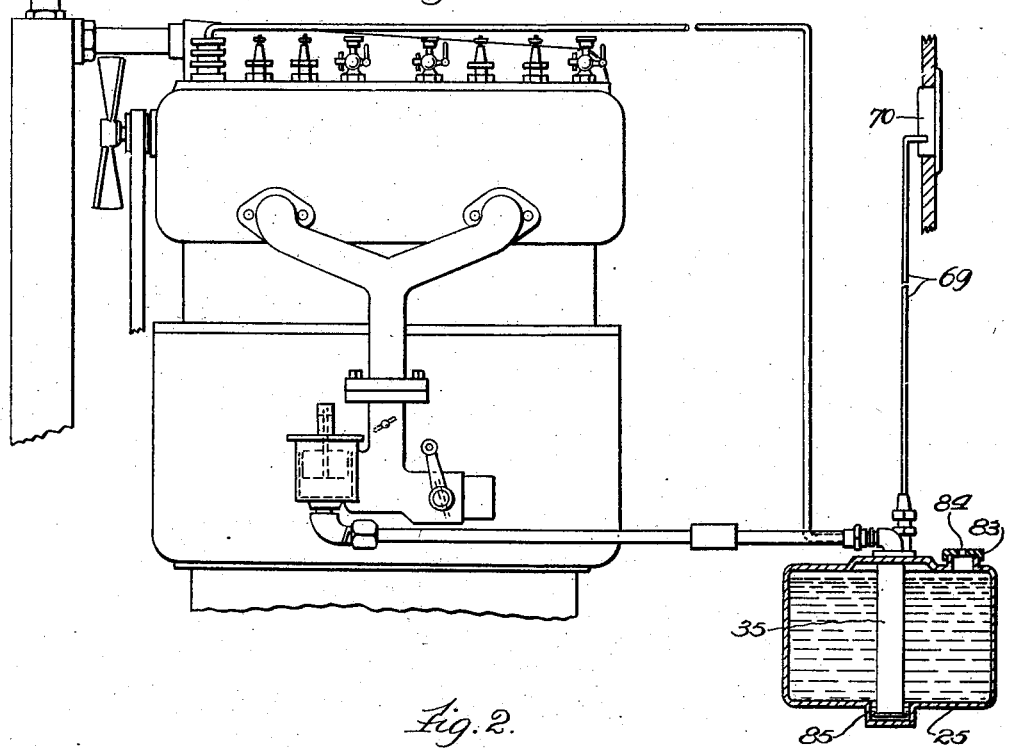
Figure 1 is a diagrammatic view showing the relative position of the main fuel tank the depth of whose liquid contents is to be indicated with respect to the engine.
Figure 2:
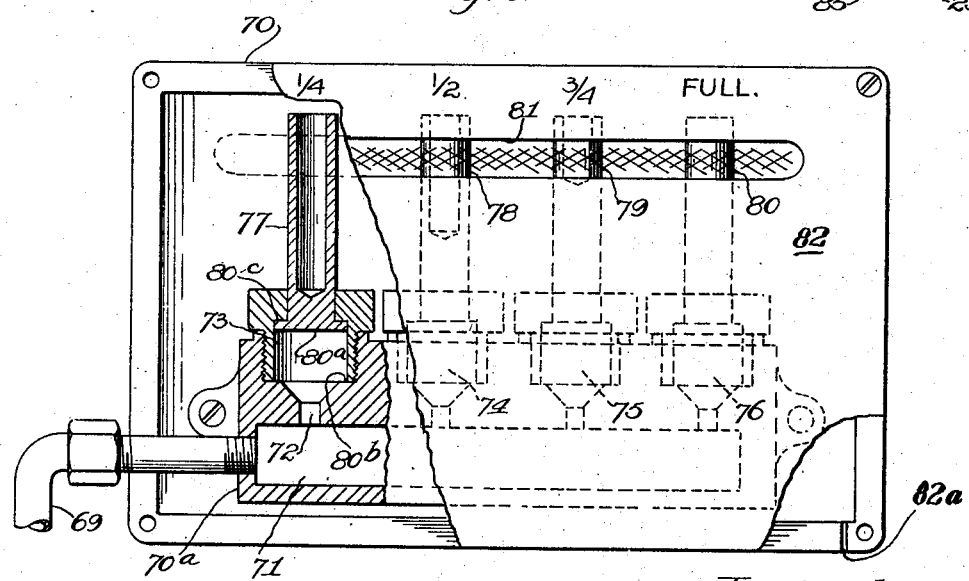
Figure 2 is a detail elevation with the face plate partly broken away to disclose the interior of the indicating device mounted on the dash in sight of the driver.

For this purpose the indicator, 70 mounted as mentioned at the dash, comprises a casting, $70^a$, having a horizontal passageway, 71, which communicates with four or more upwardly directed passageways, 72, leading to four cylinders, 73, 74, 75 and 76, which carry plungers, 77, 78, 79 and 80, which are all of the same size, but which have progressive differences in weight due to the coring out of the same to different degrees, as shown in dotted line in Figure 2, indicating respectively the one-quarter, one-half, three-quarters and full positions of the gasoline level in the fuel supply reservoir, 25. Each of the plungers has a piston, $80^a$, located thereon, the movement of which is limited in downward direction by a shoulder, $80^b$, in the casting, $70^a$, and the upward movement of which is controlled by an annular projection, $80^c$, at the upper end of the cylinder in each instance. The shoulder, $80^b$, and the annular projection, $80^c$, co-operate also as valve seats to prevent the escape of the gas under pressure in the indicator. The upper ends of the apertures, 77, 78, 79 and 80, preferably project above a glass covered slot, 81, in a dustproof housing, 82, having a small vent, $82^a$, said housing being mounted on the dash so that by observing the positions of the respective plungers the level of the gasoline in the main supply tank will always be known to the driver of the car. The fuel supply reservoir, 25, is provided with the usual cap, 83, at the filling opening having a vent aperture, 84, and preferably at the bottom of the tank there is a depression, 85, for receiving the lower end of the feeding apparatus.

It will be understood that in the construction thus described the disappearance from the slot, 81, of the plunger, 80, would indicate that the reservoir is only three-quarters full, and when the plunger, 79, disappears it will be known that the reservoir is only half full; when the plunger, 78, disappears from the slot the driver will know that the tank is only one-quarter full, and when the plunger, 77, disappears, it will be known that the tank is dangerously near empty; and the instructions will be of course to attend to the matter of filling the tank promptly after the disappearance of the plunger, 78, showing the tank one-quarter empty.

While I have described this invention in detail, it will be understood that many changes may be made therein without departing from the spirit and intent of the invention.

I claim:—

1. A construction for indicating pressure due to head of liquid, consisting of a plurality of visibly positioned plungers, each comprising a piston head, vertically positioned cylinders in which the piston heads respectively reciprocate, a duct through which the said cylinders have communication at their lower ends with the pressure to be indicated, the plungers being of different weight, whereby as the pressure to be indicated increases they are thrust up in the respective cylinders successively in the order of their weights.

2. An apparatus for indicating the depth of liquid in a container, consisting of a fluid-enclosing chamber and connection thereto from the container for pressure on the fluid enclosed in said chamber, corresponding to the depth of liquid in the container; a series of pressure responsive elements mounted in exposure to the pressure of said enclosed fluid, said elements being adapted in different degrees to resist and yield to said fluid pressure; whereby they are adapted to be moved in degrees differing according to the variation of depth of liquid in the container.

3. The construction defined in claim 2, said plungers being of different weights and being mounted for movement against gravity, whereby their weight constitutes their resistance to the fluid pressure and they are moved different distances from an initial position by any given pressure, and means for stopping them all at the same final position.

4. In combination, a liquid reservoir, a fluid-enclosing chamber and connection thereto from the reservoir for communicating to the enclosed fluid, a degree of pressure corresponding to the depth of liquid in the reservoir and a series of plungers mounted for yieldingly resisting said fluid pressure each to a different degree, and adapted to be moved to and from a predetermined indicating position successively as the fluid pressure increases and diminishes.

5. The construction defined in claim 4, the plungers being of different weights and being mounted for movement against gravity, whereby their weight constitutes their resistance to the fluid pressure, and means for stopping them all at the same predetermined indicating position.

In testimony whereof, I have hereunto set my hand at New York, N. Y., this 4th day of December, 1926.

EDWARD A. ROCKWELL.